(12) United States Patent
Yoon et al.

(10) Patent No.: US 11,024,896 B2
(45) Date of Patent: Jun. 1, 2021

(54) BATTERY MODULE WITH COOLING UNIT TO COVER EXPOSED PARTS OF ADJACENT BATTERY CELL ASSEMBLIES, BATTERY PACK INCLUDING BATTERY MODULE, AND VEHICLE INCLUDING BATTERY PACK

(71) Applicant: LG CHEM, LTD., Seoul (KR)

(72) Inventors: Ji-Su Yoon, Daejeon (KR); Jae-Uk Ryu, Daejeon (KR); Dal-Mo Kang, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 245 days.

(21) Appl. No.: 16/307,682

(22) PCT Filed: Feb. 12, 2018

(86) PCT No.: PCT/KR2018/001818
§ 371 (c)(1),
(2) Date: Dec. 6, 2018

(87) PCT Pub. No.: WO2018/169216
PCT Pub. Date: Sep. 20, 2018

(65) Prior Publication Data
US 2019/0221901 A1    Jul. 18, 2019

(30) Foreign Application Priority Data

Mar. 15, 2017  (KR) .................. 10-2017-0032572

(51) Int. Cl.
*H01M 10/613*  (2014.01)
*H01M 2/10*  (2006.01)
(Continued)

(52) U.S. Cl.
CPC .......... *H01M 10/613* (2015.04); *H01M 2/10* (2013.01); *H01M 2/1077* (2013.01); *H01M 2/20* (2013.01);
(Continued)

(58) Field of Classification Search
CPC ........ H01M 10/613; H01M 2/20; H01M 2/10; H01M 10/655; H01M 2/1077;
(Continued)

(56) References Cited

U.S. PATENT DOCUMENTS

2009/0075162 A1  3/2009  Takahashi
2009/0305124 A1  12/2009  Ahn et al.
(Continued)

FOREIGN PATENT DOCUMENTS

EP  2 187 473 A1  5/2010
JP  2000-90976 A  3/2000
(Continued)

OTHER PUBLICATIONS

International Search Report for PCT/KR2018/001818 dated Jun. 5, 2018.
(Continued)

*Primary Examiner* — Kwang Han
(74) *Attorney, Agent, or Firm* — Birch, Stewart, Kolasch & Birch, LLP

(57) ABSTRACT

A battery module includes a plurality of battery cell assemblies, each having at least one battery cell; a bottom case configured to accommodate the plurality of battery cell assemblies; an upper case mounted to an upper side of the bottom case to expose a part of an upper side, a part of a front side and a part of a rear side of adjacent battery cell assemblies of the plurality of battery cell assemblies; and a cooling unit configured to cover the exposed parts of the
(Continued)

adjacent battery cell assemblies and having a phase change material for cooling the adjacent battery cell assemblies.

15 Claims, 7 Drawing Sheets

(51) Int. Cl.
*H01M 2/20* (2006.01)
*H01M 10/643* (2014.01)
*H01M 10/6556* (2014.01)
*H01M 10/625* (2014.01)
*H01M 10/655* (2014.01)
*H01M 10/6569* (2014.01)

(52) U.S. Cl.
CPC ......... *H01M 2/206* (2013.01); *H01M 10/625* (2015.04); *H01M 10/643* (2015.04); *H01M 10/655* (2015.04); *H01M 10/6556* (2015.04); *H01M 10/6569* (2015.04); *H01M 2220/20* (2013.01)

(58) Field of Classification Search
CPC ............... H01M 2/206; H01M 10/643; H01M 10/6569; H01M 10/6556; H01M 10/625; H01M 2220/20; H01M 2/1072; Y02E 60/10

See application file for complete search history.

(56) References Cited

U.S. PATENT DOCUMENTS

| | | | |
|---|---|---|---|
| 2011/0090614 A1 | 4/2011 | Guerin et al. | |
| 2011/0293986 A1 | 12/2011 | Kozu | |
| 2011/0300433 A1 | 12/2011 | Kim | |
| 2011/0305935 A1 | 12/2011 | Yoon | |
| 2012/0037210 A1 | 2/2012 | Lim | |
| 2013/0202934 A1 | 8/2013 | Bae | |
| 2013/0244066 A1 | 9/2013 | Kang et al. | |
| 2014/0370354 A1* | 12/2014 | Yang | H01M 10/623 429/120 |
| 2015/0207188 A1 | 7/2015 | Choi et al. | |
| 2016/0344061 A1 | 11/2016 | Maguire et al. | |
| 2017/0005371 A1 | 1/2017 | Chidester et al. | |
| 2017/0012330 A1 | 1/2017 | Kim et al. | |
| 2017/0125755 A1* | 5/2017 | Kim | H01M 10/643 |
| 2018/0063972 A1* | 3/2018 | Yang | H05K 5/0221 |

FOREIGN PATENT DOCUMENTS

| | | | |
|---|---|---|---|
| JP | 2001-35450 | A | 2/2001 |
| JP | 2001-255085 | A | 9/2001 |
| JP | 2006-92935 | A | 4/2006 |
| JP | 2010-123349 | A | 6/2010 |
| JP | 2011-508366 | A | 3/2011 |
| JP | 2012-221844 | A | 11/2012 |
| JP | 2012-53019 | A | 12/2012 |
| JP | WO2011/064956 | A1 | 4/2013 |
| JP | 2014-35918 | A | 2/2014 |
| JP | 2015-92131 | A | 5/2015 |
| JP | 2017-501538 | A | 1/2017 |
| KR | 10-2007-0099066 | A | 10/2007 |
| KR | 10-1029837 | B1 | 4/2011 |
| KR | 10-1084224 | B1 | 11/2011 |
| KR | 10-1136310 | B1 | 4/2012 |
| KR | 10-2012-0075431 | A | 7/2012 |
| KR | 10-2012-0111686 | A | 10/2012 |
| KR | 10-2013-0090100 | A | 8/2013 |
| KR | 10-2015-0068247 | A | 6/2015 |
| KR | 10-2015-0099965 | A | 9/2015 |
| KR | 10-2016-0108960 | A | 9/2016 |

OTHER PUBLICATIONS

Indian Office Action dated Feb. 25, 2021 for Application No. 201917010627.

* cited by examiner

BATTERY MODULE WITH COOLING UNIT TO COVER EXPOSED PARTS OF ADJACENT BATTERY CELL ASSEMBLIES. BATTERY PACK INCLUDING BATTERY MODULE, AND VEHICLE INCLUDING BATTERY PACK

TECHNICAL FIELD

The present disclosure relates to a battery module, a battery pack including the battery module, and a vehicle including the battery pack.

The present application claims priority to Korean Patent Application No. 10-2017-0032572 filed on Mar. 15, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

Since a battery pack of a multi-module structure is manufactured so that a plurality of secondary batteries are densely packed in a narrow space, it is important to easily discharge heat generated from each secondary battery. Since the charging or discharging process of the secondary battery is performed by electrochemical reaction, if the heat of the battery module generated during charging and discharging is not effectively removed, heat accumulation may occur, resulting in deterioration of the battery module and causing ignition or explosion.

Thus, a high-capacity large-capacity battery module and a battery pack including the battery module should have a cooling device for cooling the battery cells included therein.

Generally, the cooling device may be classified into two types, namely an air cooling type and a water cooling type, and the air cooling type is more widely used than the water cooling type due to the problems such as current leakage or waterproofing of the secondary battery.

Since the power produced by one secondary battery cell is not so large, a commercially available battery module generally includes a plurality of battery cells as many as necessary that are stacked and packaged in a module case. In order to maintain the proper temperature of the secondary battery by cooling the heat generated while the individual battery cells are producing electricity, a plurality of cooling tubes for introducing a coolant are inserted in the middle of the battery cells, and cooling pumps are mounted to the battery module to smoothly supply the coolant to the cooling tubes.

However, in the conventional battery module having the water cooling structure, the space efficiency of the battery cells in the battery module is reduced due to the cooling tubes and the cooling pumps for the coolant. That is, the energy density of the battery module is lowered.

In addition, in the conventional battery module of the water cooling type, it is difficult to design the battery module in which the cooling tubes and the cooling pumps are mounted.

Thus, there is a need to find a way to provide a battery module with improved energy density and a simpler cooling structure, a battery pack including the battery module, and a vehicle including the battery pack.

DISCLOSURE

Technical Problem

Therefore, the present disclosure is directed to providing a battery module with improved energy density and a simpler cooling structure, a battery pack including the battery module, and a vehicle including the battery pack.

Technical Solution

In one aspect of the present disclosure, there is provided a battery module, comprising: a plurality of battery cell assemblies, each having at least one battery cell; a bottom case configured to accommodate the plurality of battery cell assemblies; an upper case mounted to an upper side of the bottom case to expose a part of an upper side, a part of a front side and a part of a rear side of adjacent battery cell assemblies of the plurality of battery cell assemblies; and a cooling unit configured to cover the exposed parts of the adjacent battery cell assemblies and having a phase change material for cooling the adjacent battery cell assemblies.

The cooling unit may include: a base frame inserted into the upper case to come into contact with the exposed parts of the adjacent battery cell assemblies; the phase change material accommodated at an upper side of the base frame; and a cover frame mounted to an upper side of the base frame to seal the phase change material.

The base frame may include: a base body configured to cover the exposed part of the upper side of the adjacent battery cell assemblies and having an accommodation groove for accommodating the phase change material; base bridges provided at opposite ends of the base body to cover the exposed part of the front side and the exposed part of the rear side of the adjacent battery cell assemblies; and a partitioning bridge provided between the base bridges to partition facing, adjacent battery cell assemblies.

The partitioning bridge may be disposed between the facing battery cell assemblies and come into contact with the facing battery cell assemblies.

The cover frame may protrude along a front and rear direction of the upper case by a predetermined length.

The cooling unit may be provided in plural, and the plurality of cooling units may be disposed to be spaced apart from each other by a predetermined distance along a right and left direction of the upper case.

Each of the plurality of battery cell assemblies may include: the at least one battery cell provided in plural, wherein the plurality of battery cells are stacked on one another; a cell housing configured to cover the plurality of battery cells; a pair of bur bars mounted to a front side and a rear side of the cell housing and electrically connected to the plurality of battery cells; and a pair of heat conduction pads respectively mounted to the pair of bur bars to transfer heat of the plurality of battery cells.

Each of the battery cells may be disposed to lie down in a horizontal direction parallel to a front and rear direction of the plurality of battery cell assemblies.

The plurality of battery cells may be cylindrical secondary batteries.

The cell housing may include: a front housing configured to cover a front side of the plurality of battery cells; a rear housing configured to cover a rear side of the plurality of battery cells; and a body housing provided between the front housing and the rear housing to cover the plurality of battery cells.

The pair of bur bars may be respectively mounted to the front housing and the rear housing.

In another aspect of the present disclosure, there is also provided a battery pack, comprising: at least one battery module according to the above embodiments; and a case beam into which the at least one battery module is inserted by sliding.

The case beam may have a cooling channel through which a coolant for cooling the at least one battery module flows.

The cooling unit may be disposed in contact with the case beam near the cooling channel.

In another aspect of the present disclosure, there is also provided a vehicle, comprising at least one battery pack according to the above embodiments.

Advantageous Effects

According to various embodiments as above, it is possible to provide a battery module with improved energy density and a simpler cooling structure, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
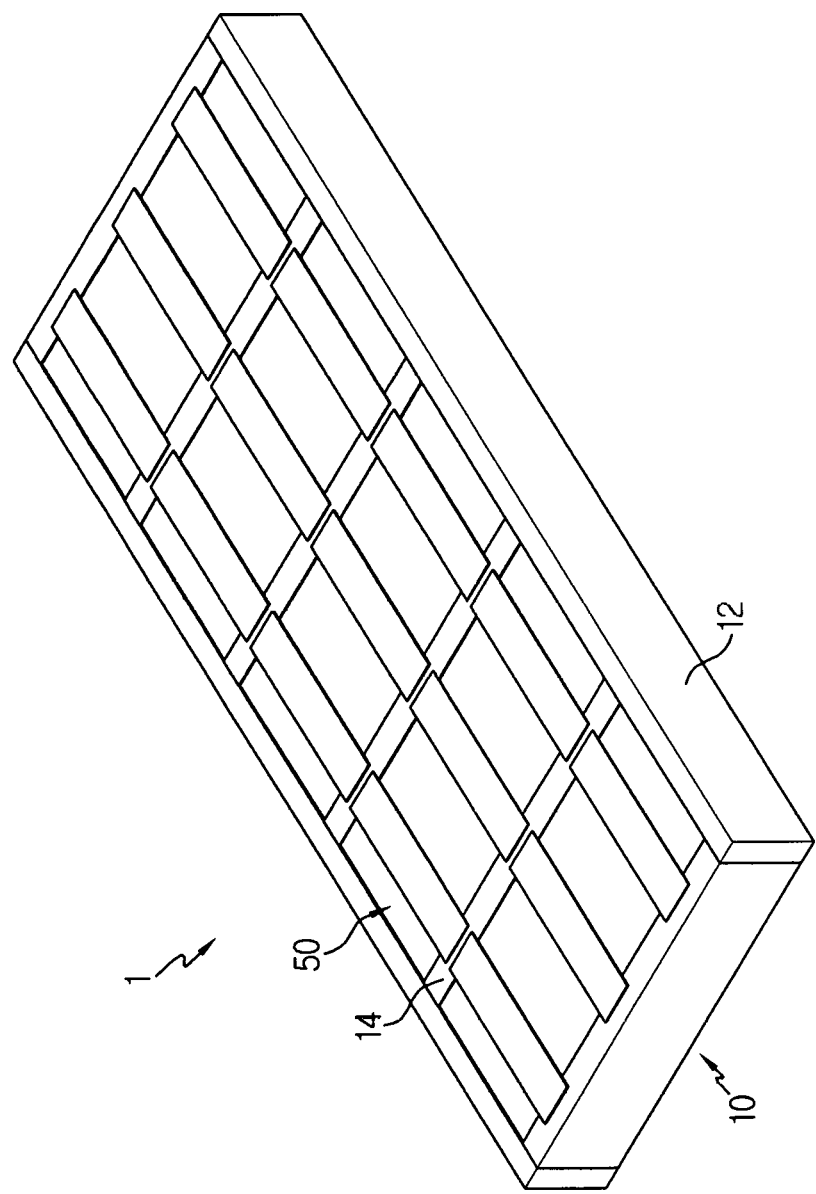
FIG. 1 is a diagram for illustrating a battery pack according to an embodiment of the present disclosure.
Figure 2:
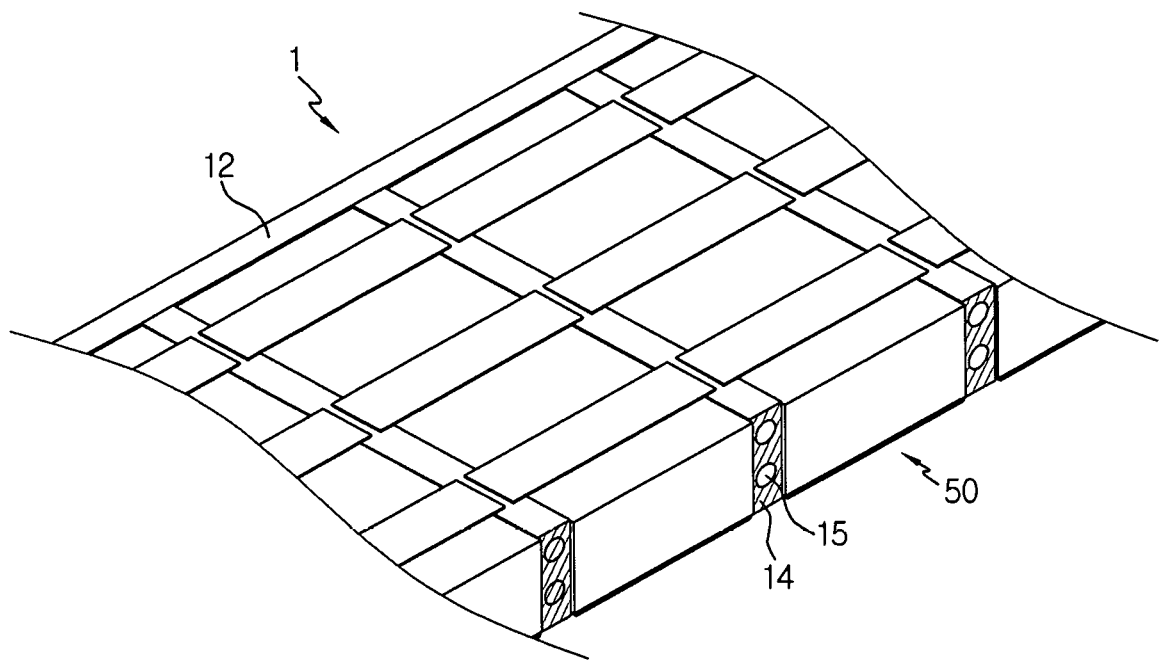
FIG. 2 is a diagram showing the battery pack of FIG. 1, from which a partial beam base of a case beam is excluded.

FIG. 1 is a diagram for illustrating a battery pack according to an embodiment of the present disclosure, and FIG. 2 is a diagram showing the battery pack of FIG. 1, from which a partial beam base of a case beam is excluded.

Referring to FIGS. 1 and 2, a battery pack 1 may be provided at a vehicle as a fuel source for the vehicle. As an example, the battery pack 1 may be provided at an electric vehicle, a hybrid vehicle, or any other vehicle that may use the battery pack 1 as a fuel source. In addition, the battery pack 1 may be provided at other devices, instruments or facilities such as an energy storage system using a secondary battery, in addition to the vehicle.

The battery pack 1 may include a case beam 10 and a battery module 50.

The case beam 10 forms the appearance of the battery pack 1 and may accommodate at least one battery module 50, explained later. Here, the at least one battery module 50, explained later, may be mounted to the case beam 10 through sliding insertion. The sliding insertion will be described in more detail in the following description.

The case beam 10 may include a beam base 12 and a beam bridge 14.

The beam base 12 is elongated along a front and rear direction of the case beam 10 and may be provided in a pair so that the pair of beam bases 12 are spaced apart from each other by a predetermined length in the right and left direction. Inside the pair of beam bases 12, a cooling channel 15 in which a coolant flows may be provided.

The beam bridge 14 connects the pair of beam bases 12 and may be provided in plural. The plurality of beam bridges 14 may be spaced apart from each other by a predetermined distance in the front and rear direction of the case beam 10.

At least one battery module 50, explained later, or a plurality of battery modules 50 in this embodiment, may be mounted between the plurality of beam bridges 14 through sliding insertion. In other words, each battery module 50 may be slid along the right and left direction between the beam bridges 14 and fixedly mounted between the beam bridges 14.

The cooling channel 15 may be formed in each beam bridge 14.

The cooling channel 15 is formed along the longitudinal direction of the beam bridge 14 and may be disposed before and after the at least one battery module 50, explained later.

In addition, the cooling channel 15 is also provided in the beam base 12 and thus may be disposed around the battery module 50.

A coolant capable of cooling the at least one battery module 50, explained later, may flow in the cooling channel 15. The coolant may be supplied from a coolant circulating unit (not shown) that may be separately mounted to the case beam 10 or integrally mounted to the case beam 10.

At least one battery module 50 or a plurality of battery modules 50 may be provided. Hereinafter, in this embodiment, it is assumed that a plurality of the battery modules 50 are provided. The plurality of battery modules 50 may be mounted to the case beam 10 through sliding insertion.

Seeing the process of mounting the plurality of battery modules 50 in more detail, first, a worker or the like may couple any one beam base 12 of the case beam 10 to the plurality of beam bridges 14.

After that, the worker or the like may dispose the plurality of battery modules 50 between the plurality of beam bridges 14 by sliding them between the plurality of beam bridges 14.

If the plurality of battery modules 50 is completely slidably inserted, the worker or the like may package the plurality of battery modules 50 in the case beam 10 by mounting the other beam base 12 of the case beam 10.

As described above, in this embodiment, since the plurality of battery modules 50 may be mounted to the case beam 10 only by sliding insertion without a separate bolting structure, the manufacturing efficiency of the battery pack 1 may be significantly increased.

Hereinafter, the plurality of battery modules 50 will be described in more detail.

Figure 3:
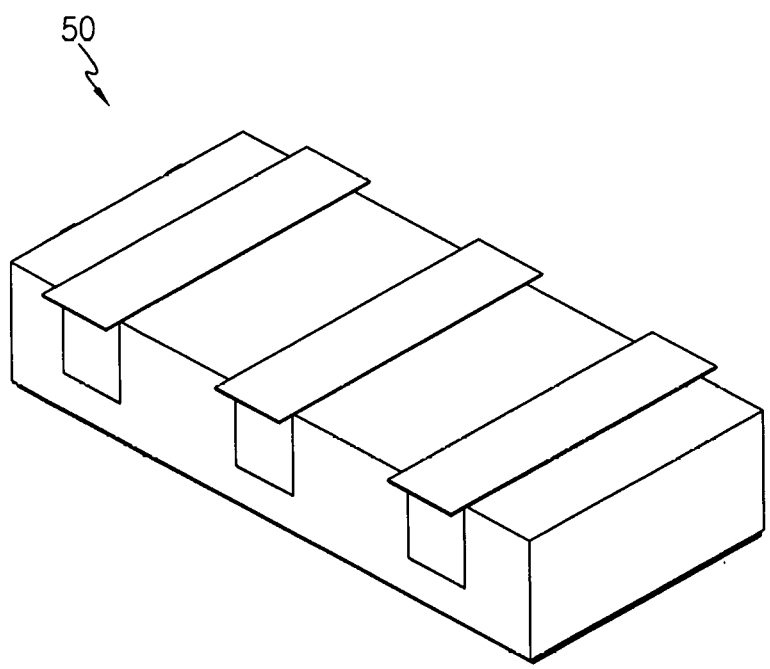
FIG. 3 is a diagram for illustrating a battery module of the battery pack of FIG. 1.
Figure 4:
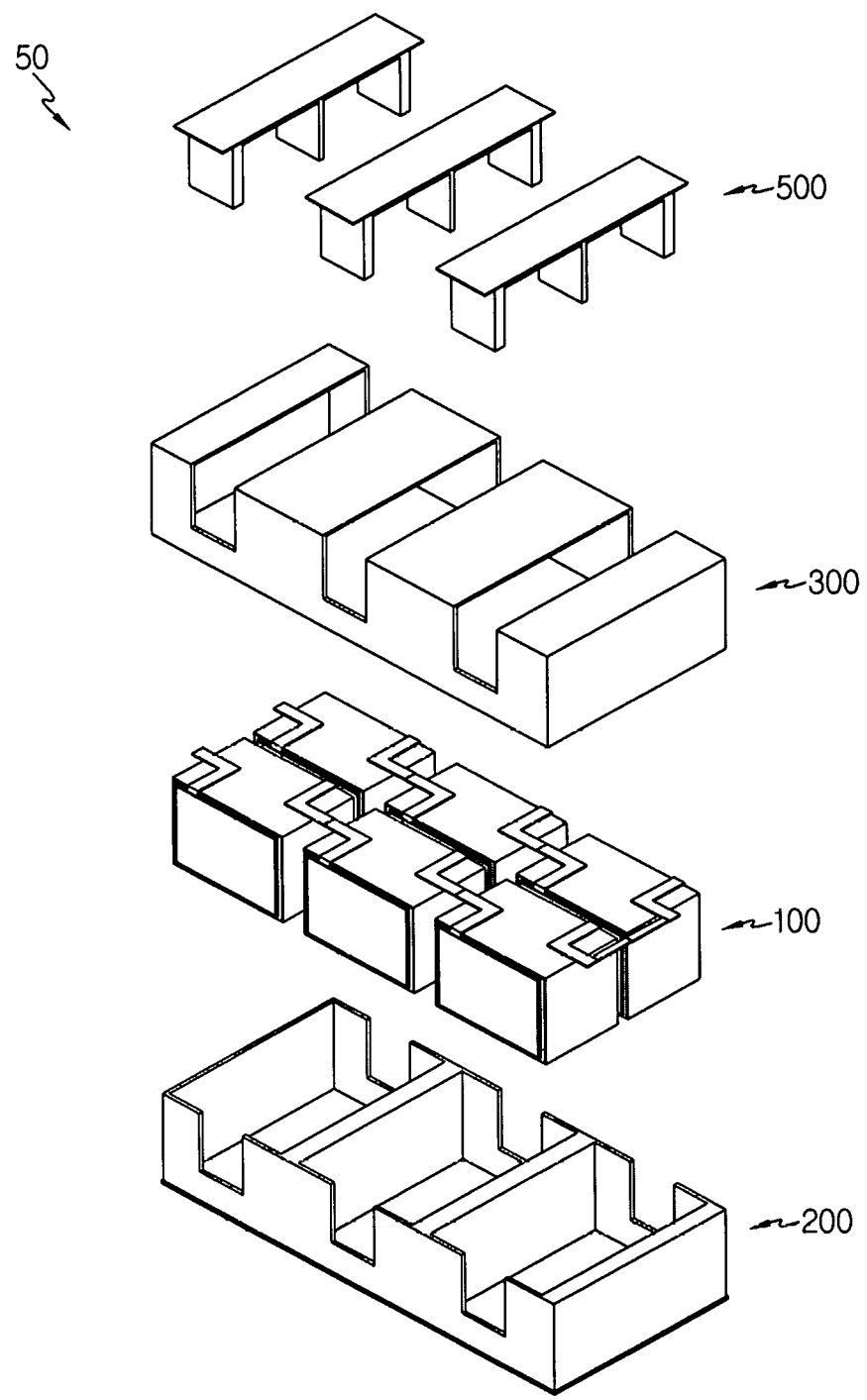
FIG. 4 is an exploded perspective view showing the battery module of FIG. 3.

FIG. 3 is a diagram for illustrating a battery module of the battery pack of FIG. 1, and FIG. 4 is an exploded perspective view showing the battery module of FIG. 3.

Referring to FIGS. 3 and 4, each battery module 50 may include a battery cell assembly 100, a bottom case 200, an upper case 300 and a cooling unit 500.

At least one battery cell assembly 100 or a plurality of battery cell assemblies 100 may be provided. Hereinafter, in this embodiment, it is assumed that a plurality of battery cell assemblies 100 are provided.

Hereinafter, the plurality of battery cell assemblies 100 will be described in more detail with reference to FIGS. 5 and 6.

Figure 5:
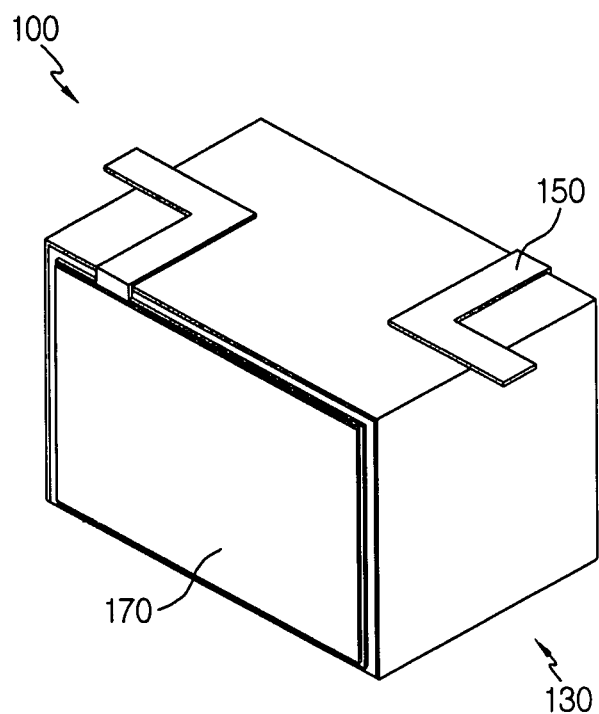
FIG. 5 is a perspective view showing a battery cell assembly of the battery module of FIG. 4.
Figure 6:
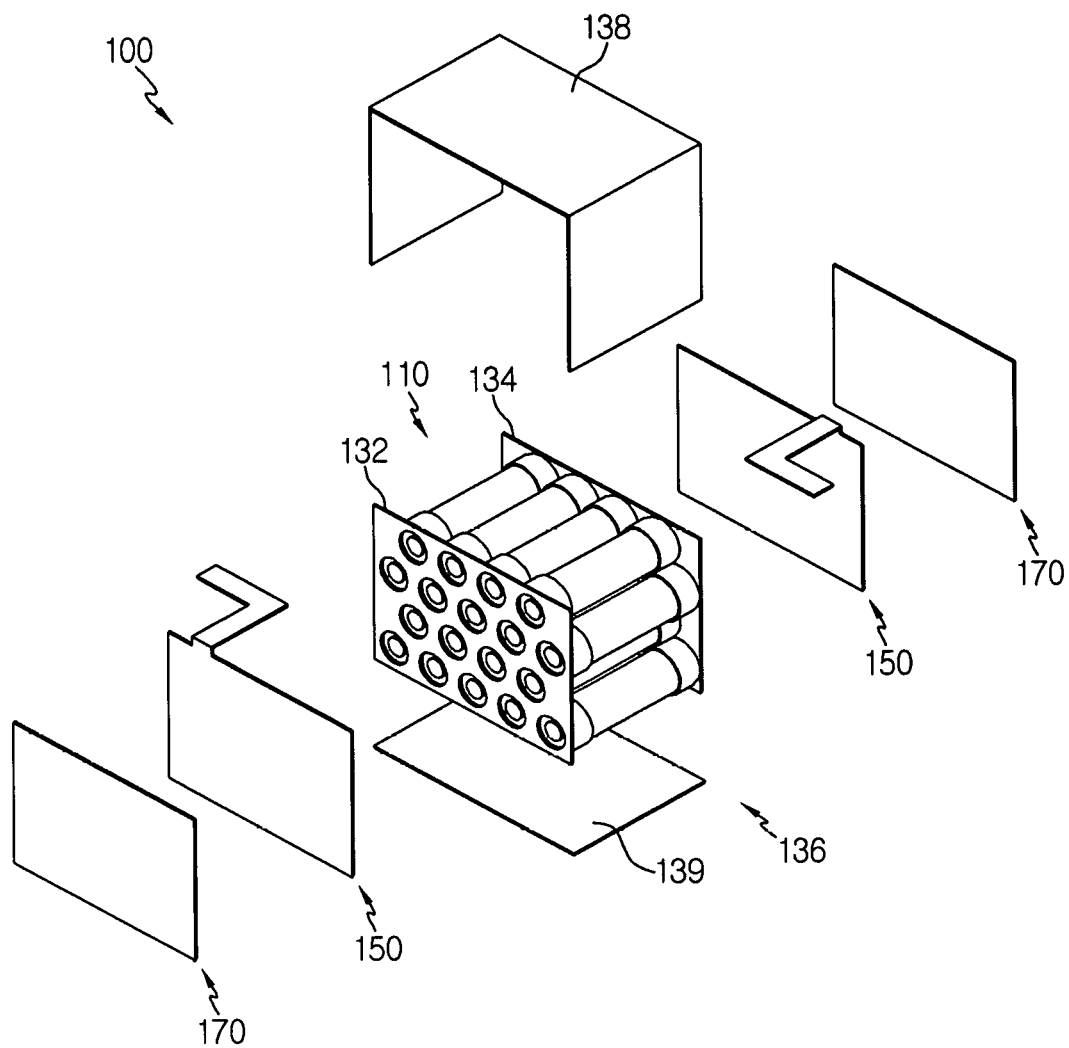
FIG. 6 is an exploded perspective view showing the battery cell assembly of FIG. 5.

FIG. 5 is a perspective view showing a battery cell assembly of the battery module of FIG. 4, and FIG. 6 is an exploded perspective view showing the battery cell assembly of FIG. 5.

Referring to FIGS. 5 and 6, each battery cell assembly 100 may include a battery cell 110, a cell housing 130, a pair of bur bars 150 and a pair of heat conduction pads 170.

The battery cell 110 may be a cylindrical secondary battery, and at least one battery cell 110 or a plurality of battery cells 110 may be provided. Hereinafter, in this embodiment, it is assumed that a plurality of battery cells 110 are provided.

The plurality of battery cells 110 may be disposed to be stacked on one another. Specifically, each battery cell 110 may be disposed to lie down in a horizontal direction parallel to the front and rear direction of the plurality of battery cell assemblies 100. In detail, the plurality of battery cells 110 may be disposed to lie down in the horizontal direction and stacked in the vertical direction.

In this embodiment, since the plurality of battery cells 110 are disposed to lie down in the horizontal direction, considering that the battery pack 1 is generally disposed below a passenger when being mounted to a vehicle, the safety of the passenger located above the plurality of battery cells 110 may be relatively secured when an event such as ignition or explosion occurs.

The cell housing 130 is for covering the plurality of battery cells 110 and may include a front housing 132, a rear housing 134 and a body housing 136.

The front housing 132 may cover a front side of the plurality of battery cells 110. The rear housing 134 may cover a rear side of the plurality of battery cells 110.

The body housing 136 may cover the plurality of battery cells 110 between the front housing 132 and the rear housing 134. Specifically, the body housing 136 may cover an upper side, a lower side and both lateral sides of the plurality of battery cells 110 and may include a housing cover 138 and a housing base 139.

The housing cover 138 may cover the upper side and both lateral sides of the plurality of battery cells 110. The housing base 139 may cover the lower side of the plurality of battery cells 110.

The pair of bur bars 150 are mounted to front and rear sides of the cell housing 130, respectively, and may be electrically connected to the plurality of battery cells 110. Any one of the pair of bur bars 150 is mounted to the front side of the front housing 132 and may be electrically connected to any one of positive and negative electrodes of the plurality of battery cells 110. The other of the pair of bur bars 150 is mounted to the rear side of the rear housing 134 and may be electrically connected to the other of the positive and negative electrodes of the plurality of battery cells 110.

The pair of heat conduction pads 170 are for transferring heat of the plurality of battery cells 110 and may be mounted to the front and rear sides of the pair of bur bars 150, respectively. The pair of heat conduction pads 170 may improve the cooling performance when cooling the plurality of battery cells 110.

Referring to FIGS. 3 and 4 again, the bottom case 200 may accommodate the plurality of battery cell assemblies 100. To this end, the bottom case 200 may have an accommodation space for accommodating the plurality of battery cell assemblies 100.

The upper case 300 is mounted to the upper side of the bottom case 200 and may expose a part of the upper side, a part of the front side and a part of the rear side of the plurality of battery cell assemblies 100. This is in order to dispose the plurality of cooling units 500 nearer to the cooling channel 15 (see FIGS. 1 and 2) of the case beam 10 (see FIGS. 1 and 2), explained later.

The cooling unit 500 is for improving the cooling performance of the plurality of battery cell assemblies 100 and may cover the exposed parts of the plurality of battery cell assemblies 100 and may be disposed in contact with or adjacent to the case beam 10.

Accordingly, the cooling unit 500 may be located close to the cooling channel 15 (see FIGS. 1 and 2) of the beam bridge 14 (see FIGS. 1 and 2) of the case beam 10 (see FIGS. 1 and 2) and disposed in contact with the beam bridge 14 of the case beam 10.

The cooling unit 500 may be provided in plural. The plurality of cooling units 500 may be spaced apart from each other by a predetermined distance along the right and left direction of the upper case 300.

Hereinafter, the plurality of cooling units 500 will be described in more detail with reference to FIGS. 7 to 9.

Figure 7:
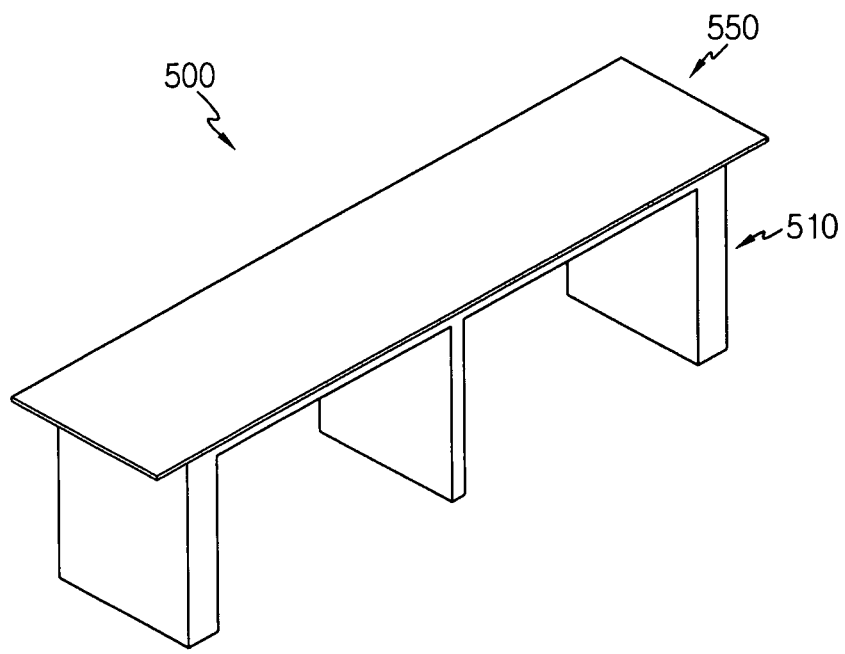
FIG. 7 is a perspective view showing a cooling unit of the battery module of FIG. 4.
Figure 8:
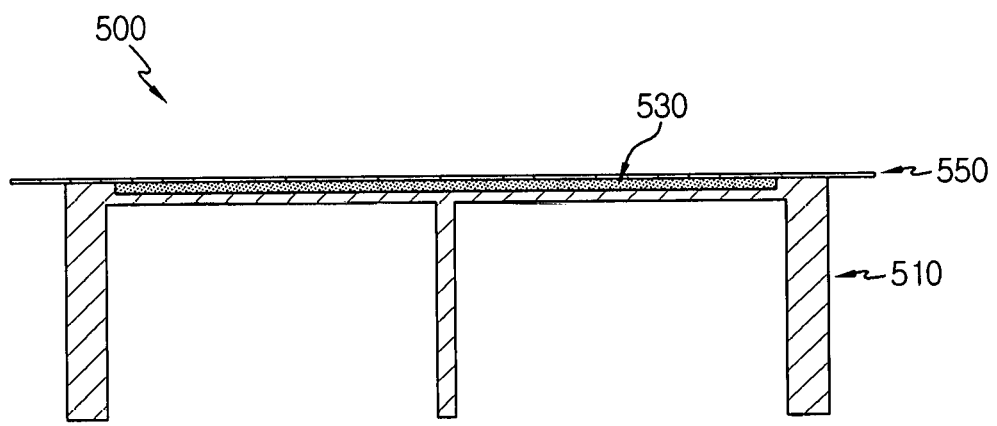
FIG. 8 is a cross-sectioned view showing the cooling unit of FIG. 7.
Figure 9:
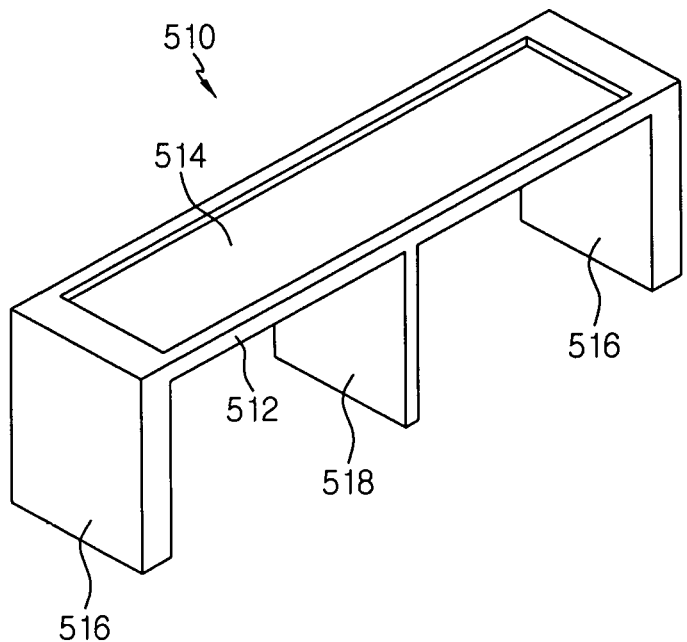
FIG. 9 is a perspective view showing a base body of the cooling unit of FIG. 7.

FIG. 7 is a perspective view showing a cooling unit of the battery module of FIG. 4, FIG. 8 is a cross-sectioned view showing the cooling unit of FIG. 7, and FIG. 9 is a perspective view showing a base body of the cooling unit of FIG. 7.

Referring to FIGS. 7 to 9, each cooling unit 500 may include a base frame 510, a phase change material 530 and a cover frame 550.

The base frame 510 is made of a metal with a high thermal conductivity and may be inserted into the upper case 300 and come into contact with the exposed parts of the plurality of battery cell assemblies 100. The base frame 510 may include a base body 512, a base bridge 516 and a partitioning bridge 518.

The base body 512 may cover a part of the upper side of the plurality of battery cell assemblies 100. The base body 512 may have an accommodation groove 514. The accommodation groove 514 is provided at the upper surface of the base body 512 and may accommodate the phase change material 530, explained later.

The base bridges 516 may be provided in a pair and disposed at both ends of the base body 512 in the front and rear direction, respectively. The pair of base bridges 516 may cover a part of the front side and a part of the rear side of the plurality of battery cell assemblies 100.

The partitioning bridge 518 is provided between the pair of base bridges 516 and may partition the battery cells 100 facing each other in the front and rear direction of the upper case 300, in the plurality of battery cell assemblies 100.

Specifically, the partitioning bridge 518 protrudes from the lower side of the base body 512 to be disposed between the battery cells 100 facing each other in the front and rear direction of the upper case 300 and may be disposed in contact with the facing battery cell assemblies 100 in order to improve the heat transfer efficiency.

The phase change material 530 is a material capable of improving the cooling performance of the plurality of battery cell assemblies 100 and may be accommodated above the base frame 510. Specifically, the phase change material 530 may be filled in the accommodation groove 514 of the base body 512.

The phase change material 530 may be provided as a material that may change from a gas to a liquid or from a liquid to a gas through a phase change. For example, the phase change material 530 may be provided a material with as a low boiling point, for example a Novec-based material.

The cover frame 550 may be made of a metal material with high thermal conductivity, similar to the base frame 510, and may be mounted to the upper side of the base frame 510. Specifically, the cover frame 550 may be mounted to the upper side of the base body 512 to seal the accommodation groove 514 that accommodates the phase change material 530.

The cover frame 550 may protrude by a predetermined length along the front and rear direction of the upper case 300. The protruding portion of the cover frame 550 may be placed on the upper side of the beam bridge 14 (see FIGS. 1 and 2) of the case beam 10 (see FIGS. 1 and 2). Accordingly, the cooling unit 500 may be more stably fixed to the case beam 10 and may enhance the thermal conductivity to the case beam 10.

Hereinafter, the process of cooling the battery pack 1 (see FIGS. 1 and 2) through the cooling unit 500 according to this embodiment will be described in more detail.

Figure 10:
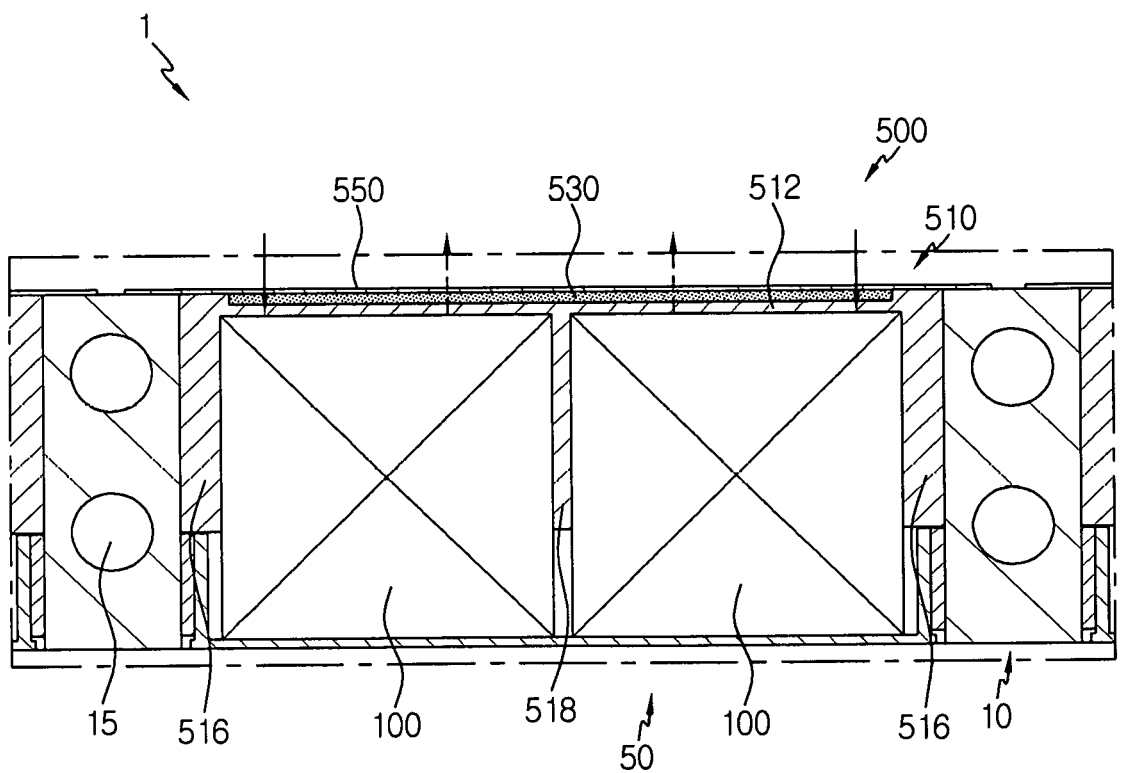
FIG. 10 is a diagram for illustrating a process of cooling the battery pack of FIG. 1.

FIG. 10 is a diagram for illustrating a process of cooling the battery pack of FIG. 1.

Referring to FIG. 10, when the temperature of the battery cell assemblies 100 of the battery pack 1 rises, the heat generated in the battery cell assemblies 100 may be transferred to the cooling unit 500 first.

First, since the base bridge 516 of the cooling unit 500 is located near the cooling channel 15 of the case beam 10, it is possible to cool the battery cell assemblies 100.

In addition, the phase change material 530 of the cooling unit 500 disposed at the upper side of the battery cell assemblies 100 may guide cooling of the battery cell assemblies 100 through evaporation and condensation.

Specifically, when the heat generated from the battery cell assemblies 100 is transferred to the base body 512 of the cooling unit 500, the phase change material 530 changes from a liquid to a the gas by means of the phase change to lower the temperature of the battery cell assemblies 100. In addition, if the temperature of the cover frame 550 in contact with the case beam 10 having the cooling channel 15 is lowered, the phase change material 530 may change its phase again from a gas to a liquid.

According to this mechanism, the phase change material 530 may improve the cooling performance of the battery cell assemblies 100 by repeating evaporation and condensation depending on the temperatures of the battery cell assemblies 100 and the cover frame 550.

As described above, the battery module 50 according to this embodiment and the battery pack 1 including the battery module 50 may ensure the cooling performance by means of the cooling unit 500 including the phase change material 530 and having a simple structure, without any conventional complicated structure such as cooling tubes and cooling pumps.

Accordingly, the battery module 50 according to this embodiment and the battery pack 1 including the battery module 50 may maximize the space efficiency of the battery cells 110 relatively.

Thus, the battery module 50 according to this embodiment and the battery pack 1 including the battery module 50 may improve the energy density of the battery cells 110 through the cooling unit 500 and implement a simpler cooling structure.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cell assemblies, each having at least one battery cell;
a bottom case configured to accommodate the plurality of battery cell assemblies;
an upper case mounted to an upper side of the bottom case to expose a part of an upper side, a part of a front side and a part of a rear side of adjacent battery cell assemblies of the plurality of battery cell assemblies; and
a cooling unit configured to cover the exposed parts of the adjacent battery cell assemblies and having a phase change material for cooling the adjacent battery cell assemblies,
wherein the cooling unit includes:
a base frame inserted into the upper case to come into contact with the exposed parts of the adjacent battery cell assemblies;

the phase change material accommodated at an upper side of the base frame; and
a cover frame mounted to an upper side of the base frame to seal the phase change material,
wherein the base frame includes:
a base body configured to cover the exposed part of the upper side of the adjacent battery cell assemblies and having an accommodation groove for accommodating the phase change material;
base bridges provided at opposite ends of the base body to cover the exposed part of the front side and the exposed part of the rear side of the adjacent battery cell assemblies; and
a partitioning bridge provided between the base bridges to partition facing battery cell assemblies of the adjacent battery cell assemblies,
wherein the cover frame, the base bridges and the partitioning bridge of the base frame are each planar, the base bridges and the partitioning bridge are arranged perpendicular to the cover frame while being parallel to each other so that the base bridges and the partitioning bridge of the base frame extend away from the base body.

2. The battery module according to claim 1,
wherein the partitioning bridge is disposed between the facing battery cell assemblies and comes into contact with the facing battery cell assemblies.

3. The battery module according to claim 1,
wherein the cover frame protrudes along a front and rear direction of the upper case by a predetermined length.

4. The battery module according to claim 1,
wherein the cooling unit is provided in plural, and
wherein the plurality of cooling units are disposed to be spaced apart from each other by a predetermined distance along a right and left direction of the upper case.

5. The battery module according to claim 1,
wherein each of the plurality of battery cell assemblies includes:
the at least one battery cell provided in plural, wherein the plurality of battery cells are stacked on one another;
a cell housing configured to cover the plurality of battery cells;
a pair of bur bars mounted to a front side and a rear side of the cell housing and electrically connected to the plurality of battery cells; and
a pair of heat conduction pads respectively mounted to the pair of bur bars to transfer heat of the plurality of battery cells.

6. The battery module according to claim 5,
wherein each of the battery cells is disposed to lie down in a horizontal direction parallel to a front and rear direction of the plurality of battery cell assemblies.

7. The battery module according to claim 5,
wherein the plurality of battery cells are cylindrical secondary batteries.

8. The battery module according to claim 5, wherein the cell housing includes:
a front housing configured to cover a front side of the plurality of battery cells;
a rear housing configured to cover a rear side of the plurality of battery cells; and
a body housing provided between the front housing and the rear housing to cover the plurality of battery cells.

9. The battery module according to claim 8,
wherein the pair of bur bars are respectively mounted to the front housing and the rear housing.

10. A battery pack, comprising:
at least one battery module defined in claim 1; and
a case beam into which the at least one battery module is inserted by sliding.

11. The battery pack according to claim 10,
wherein the case beam has a cooling channel through which a coolant for cooling the at least one battery module flows.

12. The battery pack according to claim 11,
wherein the cooling unit is disposed in contact with the case beam near the cooling channel.

13. A vehicle, comprising at least one battery pack defined in claim 10.

14. The battery pack according to claim 1, wherein the phase change material is planar, and contacts a planar surface of the cover frame.

15. The battery pack according to claim 1, wherein the partitioning bridge is interposed between two adjacent battery cell assemblies among the plurality of battery cell assemblies.

* * * * *